United States Patent [19]

Renker

[11] Patent Number: 4,550,127

[45] Date of Patent: Oct. 29, 1985

[54] COMPOSITION AND METHOD FOR FORMING MOLDED AND CAST MACHINE PARTS

[75] Inventor: Hansjörg Renker, Hilterfingen, Switzerland

[73] Assignee: Fritz Studer AG, Thun, Switzerland

[21] Appl. No.: 641,358

[22] Filed: Aug. 15, 1984

Related U.S. Application Data

[63] Continuation of Ser. No. 154,314, May 29, 1980, abandoned.

[30] Foreign Application Priority Data

May 29, 1979 [CH] Switzerland ............................ 4966/79

[51] Int. Cl.[4] .............................................. C08K 9/06
[52] U.S. Cl. ...................................... 523/212; 523/220; 523/443
[58] Field of Search ........................ 523/212, 220, 443

[56] References Cited

U.S. PATENT DOCUMENTS 3,518,221 6/1970 Kenyon et al. .
3,798,191 3/1974 Donnelly .
3,935,339 1/1976 Cooke, Jr. .

FOREIGN PATENT DOCUMENTS 1927576 12/1969 Fed. Rep. of Germany ...... 523/443

OTHER PUBLICATIONS

*Chemical Abstracts*, "Building Material, and Its Preparation", Bichsel et al., vol. 72, p. 266, abstract No. 47039w.

*Primary Examiner*—Melvyn I. Marquis
*Attorney, Agent, or Firm*—Murray Schaffer

[57] ABSTRACT

A composition for molding and casting machine parts, comprising a filler of aggregate rock material or the like, a resin-based binder system, and between 2 to 15% by weight of the total composition of inorganic or organic fibers.

7 Claims, No Drawings

COMPOSITION AND METHOD FOR FORMING MOLDED AND CAST MACHINE PARTS

This is a continuation of U.S. Ser. No.: 154,314, filed May 29, 1980, now abandoned.

BACKGROUND OF THE INVENTION

The present invention relates to a composition for forming molded and/or cast articles for machine parts, instruments, machine tools and the like; the method for forming such articles, and the molded and/or cast articles themselves.

Machine parts, machine tools and the like have been formed from compositions of sand, gravel, stone, natural or synthetic rock, held together by a binder. The articles made from such compositions are mostly thick-walled products, such as machine stands, or supports, where high rigidity, excellent inherent stability and good vibration and noise dampening properties are required. Due to the use of relatively cheap stone and rock as filler material, in high proportion to the binder, the machine parts and other articles made therefrom can be produced at low cost and in particular, with low energy expenditure, for example, at about ⅓ that of comparable parts made from aluminum and about ½ that of those made from steel.

However, the known compositions have several drawbacks, amongst which is the fact that strength, particularly the tensile strength and the bending strength, determined by the filler and the binder, is limited. The known compositions employing stone as a filler for conventional binders, have a maximum tensile strength of only 3–5 kg/mm². Further, the flow and mold filling behavior of such compositions is determined to a great extent by the percentage of the rock dines in the filler. A high fine proportion of filler reduces the inherent stability of the finished workpiece. A low fine portion of the filler yields great inherent stability, although it renders the casting more difficult and results in large, porous areas inside the workpiece, as well as on the surface. Further, it is difficult to work or machine such compositions to critical dimensions.

It has been known to form compositions having a large proportion of glass fibers and plastic binder. Such compositions, however, are, by multiples, more expensive than the compositions utilizing stone and rock, and have far lower E-modulus. In addition, the coefficient of thermal expansion of such a composition is much more difficult to control and under certain circumstances, not possible to control at all.

It is the object of the present invention to overcome the disadvantages and difficulties of the known prior art, and to provide workpieces of inherent stability and strength, utilizing the relatively inexpensive stone and rock filler material.

It is a further object of the present invention to provide such compositions in which the stone and rock are employed as filler materials, which have a flow characteristic which enables them to be easily cast and molded and which permits the production of complicated molded parts with satisfactory surface smoothness and without undesired porosity or cavities therein.

The foregoing objects, as well as others, are set forth in the following disclosure of the present invention.

SUMMARY OF THE INVENTION

According to the present invention, the composition comprises a filler of aggregate rock material or the like, resin-based binder systems, and between 2 to 20% by weight of the total composition of inorganic or organic fibers.

The filler is preferably a mixture of rock powder, sand, and gravel in any desired proportion, and includes natural as well as synthetic rock, such as concrete.

The composition can be prepared in advance, although it can also be prepared in situ within the mold. Preferably, in accordance with the present invention, the fibers are added to the resin-based binders prior to the addition of filler material, so that the fibers can be evenly dispersed throughout the binder, and so that the powder and fines of the filler materials thereafter coat the fibers so that they do not stick together.

Preferably, the fibers are sized with a silane sizing, which enhances the resin-hardener system.

Full details of the present invention follow.

DESCRIPTION OF THE PRESENT INVENTION

The resin-based binder system suitable for use in the present invention comprises a combination of a synthetic resin and resin hardener. An epoxy resin system having low exothermic reaction, low shrinking, low viscosity, high long line stability, intensive lattice-like polymerization, high wetability to $SiO_2$, silicate and $AL_2O_3$ is preferred. One such resin system is ARALDITE BY 167 bisphenol A epoxy resin/HY 167, (aliphatic polyamine Hardener), an epoxy resin system of CIBA-GEIGY. Another epoxy resin system is XP 2936 (Resin)/HY 2996 (Hardener) also of CIBA-GEIGY.

Preferably, the resin system is employed in amounts of 5 to 12% by weight of the total composition, while the hardener is employed in amounts of 2 to 7% by weight of the resin system.

The filler material preferably comprises mixtures of rock powder, sand, fine gravel, and gravel of natural or synthetic rock. The natural rock may be selected from diabase and/or white sierra granite.

Preferably, 5 to 15% by weight of the total composition can be rock powder, having an average diameter of less than 0.08 mm.; 5 to 15% by weight of the total composition can be sand, having an average grain size of 0.2 to 3 mm.; 5 to 15% can be gravel fines of an average grain size of 3 to 6 mm., while 30 to 60% by weight of the total composition can be gravel of a grain size of 6 to 16 mm. The relative percentage of the individual ingredients of the filler can be varied, as desired.

Preferably, inorganic fibers, such as glass fibers, of 2 to 5 mm long, can be used. The fibers can be sized with suitable silane sizing, which sizing adds to the effectiveness of the resin hardener system. The fibers are added in amounts of 2 to 20% by weight of the total composition.

A higher proportion of fibers provides no marked improvement in the tensile strength and E-modulus of the resultant workpiece. On the contrary, it seems to increase the cost of the product, while reducing the thermal control of the coefficient of thermal expansion. Since controlling the coefficient of thermal expansion is important, when utilizing workpieces formed from the composition of the present invention, with workpieces of iron and/or other metallic materials, there seems to be no added benefit in using higher proportions of fibers.

Other inorganic fibers which may be used are carbon and boron fibers, having a length of 2 to 5 mm and a diameter of 2 to 15 μm.

Organic fibers, such as Kevlar, manufactured by Du Pont Nemours, may also be used. Other organic fibers are polyamide fibres such as NYLON (Du Pont Nemours) and polyacryl fibres.

Such organic fibres may be used to manufacture machine parts having higher tensile strength.

Silane wash or sizing is well known for pretreating and activating the surface of numeral fibers to activate the adhesion to resin systems.

It has been found that by forming the composition mixture in a particular sequence of steps, added beneficial results are obtained.

EXAMPLE OF METHOD

According to the method of the present invention, the composition is formed by first emptying the resin into a vessel, such as the mold for the end product, thereafter adding the hardener to the resin, followed by adding the fibrous material and stirring vigorously. If the fibrous material is sized with the silane sizing, the stirring dissolves the silane from the individual fibers and spreads it evenly in the hardener resin system while dispersing the fibers more evenly throughout the resin. Thereafter, a rock powder, (diameter of less than 0.08 mm.) is added to the mixture of resin and fibers. The rock powder envelopes the individual fibers, preventing the fibers from sticking to each other, and allowing the fibers to be distributed evenly in the mixture. Thereafter, the coarse sand, fine gravel, annd more coarse rock particles are added to the mixture, until the composition is complete.

The composition thus formed is molded and cast in any of the conventional known methods. Because of the better flowability, and quick setting of the resin systems, molding and casting can be accomplished without pressure and/or heat and therefore, with no power consumption.

EXAMPLE I

A composition, containing the following ingredients:
10% synthetic resin system ARALDITE HY 167/BY 167 the amount of the hardener being 5% of the resin system
10% glass fibers, 3 mm long with silane size
10% rock powder, diameter ≦0.08 mm.
12% sand, grain size 0.2-3 mm.
13% fine gravel, grain size 3-6 mm.
15% gravel, grain size 6-10 mm.
30% gravel, grain size 10-16 mm.
was formed in accordance with the method of the present invention. The basic filler material is diabase.

From this composition, workpieces, such as: machine tool bases, jigs for aerospace industry were formed.

By conventional test methods, it was determined that the tensile strength of the molded workpieces produced in accordance with this example, was between 4 to 7 kg./mm$^2$, and that in addition to having great strength, had good inherent stability, and the composition had good flow behavior in the casting state. The workpieces thus obtained filled the mold pattern and had pore-free interior and defined surface finish. They were of high quality in the hardened state.

EXAMPLE II

Same composition as in Ex. I
The rock powder of diabase was replaced by lime stone rock powder of same percentage.

EXAMPLE III

A composition containing sizes as in Example I:
8% resin system ARALDITE HY/167/BY 167 (3% hardener)
4% glass fibers
13% rock powder, diameter ≦0.08 mm
10% sand
10% fine gravel
17% gravel, (6-10 mm)
38% gravel, (10-16 mm)

The quality (tensile strength, flow behavior) of workpieces made by this composition is the same as for the composition in Example I. In order to obtain a similar quality with prior art composition as hydraulic concrete with mineral binder, it is necessary to use prestressing due to iron parts.

What is claimed is:

1. A moldable or castable composition consisting essentially of a mixture of 6 to 14% by weight of the total composition of an epoxy resin based binder system, 2 to 7% by weight of an aliphatic polyamine hardener, 2 to 10% fibers, 5 to 15% rock power having an average size of less than 0.08 mm, 5 to 15% sand, 5 to 15% fine gravel of an average grain size of 3 to 6 mm and 30 to 60% gravel of grain size of 6 to 16 mm.

2. The composition according to claim 1 wherein said fibers are selected from the group consisting of inorganic and organic materials.

3. The composition according to claim 2 wherein said fibers have a silane sizing.

4. Articles molded or cast from the composition of claim 1.

5. The method of forming a composition of moldable or castable material, comprising the steps of admixing a resin-base fiber binder system, consisting essentially of a 6 to 14% by weight of the total composition of an epoxy resin binder system, 2 to 7% by weight of an aliphatic polyamine hardener and 2 to 10% fibers, agitating said admixture to evenly dissolve said fibers in said binder system, thereafter adding 5 to 15% by weight rock powder to said admixture to coat said fibers and subsequently adding to said admixture a filler comprising 5 to 15% by weight sand, 5 to 15% fine gravel of an average grain size of 3 to 6 mm and 30 to 60% gravel of an average grain size of 6 to 16 mm.

6. The method according to claim 5, wherein said binder system includes a resin hardener, and said fibers are silane-sized.

7. Molded and cast articles made from the composition formed in accordance with the method of claim 5.

* * * * *